United States Patent
Dong et al.

(10) Patent No.: US 10,184,065 B2
(45) Date of Patent: Jan. 22, 2019

(54) AQUEOUS COMPOSITION

(71) Applicants: Dow Global Technologies LLC, Midland, MI (US); Rohm and Haas Company, Philadelphia, PA (US)

(72) Inventors: Xiangting Dong, Shanghai (CN); Yawei Xu, Shanghai (CN); Yurun Yang, Shanghai (CN); Jinyuan Zhang, Shanghai (CN); Yangping Zhu, Shanghai (CN)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 14/893,598

(22) PCT Filed: May 30, 2013

(86) PCT No.: PCT/CN2013/076454
§ 371 (c)(1),
(2) Date: Nov. 24, 2015

(87) PCT Pub. No.: WO2014/190516
PCT Pub. Date: Dec. 4, 2014

(65) Prior Publication Data
US 2016/0115349 A1    Apr. 28, 2016

(51) Int. Cl.
| C09D 175/04 | (2006.01) |
| C09D 133/12 | (2006.01) |
| C09D 133/08 | (2006.01) |
| C08F 283/00 | (2006.01) |
| C09D 151/08 | (2006.01) |
| C08F 220/58 | (2006.01) |

(52) U.S. Cl.
CPC ........ C09D 175/04 (2013.01); C08F 283/006 (2013.01); C09D 133/08 (2013.01); C09D 133/12 (2013.01); C09D 151/08 (2013.01); C08F 220/58 (2013.01)

(58) Field of Classification Search
CPC .. C09D 175/04; C09D 133/08; C09D 133/12; C09D 151/08; C08F 283/006; C08F 220/58; C08F 220/06; C08F 220/18; C08F 220/14; C08F 2220/1858; C08F 2220/1825; C08F 2230/085
USPC ........................................................ 524/507
See application file for complete search history.

(56) References Cited

U.S. PATENT DOCUMENTS

| 2004/0167252 A1 | 8/2004 | Melchiors et al. |
| 2006/0148980 A1 | 7/2006 | Tielemans et al. |
| 2011/0172346 A1 | 7/2011 | Killilea et al. |

FOREIGN PATENT DOCUMENTS

| CN | 101157749 A |   | 4/2008 |   |
| CN | 101792570 A |   | 8/2010 |   |
| CN | 102010478 A | * | 4/2011 |   |
| CN | 102492281 A |   | 6/2012 |   |
| GB | 2362387 A |   | 11/2001 |   |
| WO | 2011123492 A2 |   | 10/2011 |   |
| WO | WO 2012084668 A1 | * | 6/2012 | ............ C08F 283/06 |
| WO | 2013091209 A1 |   | 6/2013 |   |

OTHER PUBLICATIONS

CN 102010478 A (2011), machine translation, Google Patents.*
WO 2012084668 A1 (2012), machine translation, Google Patents.*
Okamoto, Y., Hasegawa, Y., Yoshino, F.; Urethane/acrylic composite polymer emolusions; Progress in Organic Coatings 29 (1996) pp. 175-182.
International Search Report for International Application No. PCT/CN2013/076454; International Filing Date May 30, 2013; dated Mar. 13, 2014; 4 pages.
Written Opinion of the International Search Report for International Application No. PCT/CN2013/076454; International Filing Date May 30, 2013; dated Mar. 13, 2014; 6 pages.

* cited by examiner

Primary Examiner — Josephine L Chang
(74) Attorney, Agent, or Firm — Karl E. Stauss; Cantor Colburn LLP

(57) ABSTRACT

The present invention provides a composition comprising i) an acrylic polymer dispersion and ii) a polyurethane/acrylic hybrid; wherein the acrylic polymer has a Tg from 25° C. to 80° C.; the polyurethane/acrylic hybrid has a Tg from −55° C. to 0° C.; and the minimum film formation temperature of the composition is lower than 10° C. The present invention further provides a coating comprising the composition.

11 Claims, No Drawings

AQUEOUS COMPOSITION

FIELD OF THE INVENTION

The present invention relates to a low volatile organic compounds ("VOC") aqueous composition.

INTRODUCTION

Aqueous acrylic polymers have been widely applied in wood coatings. To achieve good block resistance in the final coating film, the glass transition temperature (Tg) of the acrylic polymer has to be higher than room temperatures (around 25° C.). Accordingly, the coating film will have a high (around room temperature, 25° C.) minimum film formation temperature (MFFT). An MFFT under 10° C. is suggested in the art for ease of application. In the relevant art, a coating film having both good block resistance and low MFFT is usually prepared by loading in the formulation coalescents, additives that contribute to coating film formation. The higher the Tg of the acrylic polymer is, the more coalescents are required to achieve a relatively lower MFFT. Coalescents will eventually release from the formulation into the environment, and are considered harmful to human health.

It is desirable to provide a coating formulation that affords good block resistance and comparatively low MFFT without coalescent loading.

SUMMARY OF THE INVENTION

The present invention provides a composition comprising i) an acrylic polymer dispersion and ii) a polyurethane/acrylic hybrid; wherein the acrylic polymer has a Tg from 25° C. to 80° C.; wherein the polyurethane/acrylic hybrid has a Tg from −55° C. to 0° C.; and wherein the composition has a minimum film formation temperature of lower than 10° C.

In one embodiment of the present invention, the acrylic monomers in the acrylic polymer and in the polyurethane/acrylic hybrid are different acrylic compounds.

In another embodiment of the present invention, the acrylic polymer comprises, as polymerized units, a diacetone acrylamide, and the composition comprises an adipic dihydrozide.

In yet another embodiment of the present invention, the polyurethane/acrylic hybrid dispersion comprises, as polymerized units, a diacetone acrylamide, and the composition comprises an adipic dihydrozide.

The present invention further provides a coating comprising the composition.

DETAILED DESCRIPTION OF THE INVENTION

In the present invention, the term "polyurethane" or "PU" describes polymers including oligomers which contain multiple urethane groups, i.e., —O—C(=O)—NH—, regardless of how they are made. As is well known, polyurethanes can contain additional groups such as urea, allophanate, biuret, carbodiimide, oxazolidinyl, isocyanurate, uretdione, ether, ester, carbonate, etc., in addition to urethane groups.

The term "polyacrylic" or "PA" as used herein means those polymers or resins resulting from the polymerization of one or more acrylic monomers such as methyl acrylate, ethyl acrylate, butyl acrylate, 2-ethylhexyl acrylate, acrylic acid etc., as well as methacrylate monomers such as methyl methacrylate, ethyl methacrylate, butyl methacrylate, hexyl methacrylate, cylohexyl methacrylate, benzyl methacrylate, methacrylic acid and other vinyl monomers, such as styrene, alpha-methyl styrene, ethylene, vinyl acetate, acrylonitrile and the like. Copolymers of the above acrylic and methacrylic monomers are also included within the term "polyacrylic" as it appears herein. The polymerization of the monomeric acrylic and methacrylic to provide the PA dispersions useful in the practice of the invention may be accomplished by any of the well known polymerization techniques.

The term "Tg" used herein is calculated by using the Fox equation (T. G. Fox, Bull. Am. Physics Soc., Volume 1, Issue No. 3, page 123 (1956)). That is, for calculating the Tg of a polymer of monomers $M_1$ and $M_2$, $$\frac{1}{T_g(calc.)} = \frac{w(M_1)}{T_g(M_1)} + \frac{w(M_2)}{T_g(M_2)},$$

wherein Tg (calc.) is the glass transition temperature calculated for the polymer, $w(M_1)$ is the weight fraction of monomer $M_1$ in the polymer, $w(M_2)$ is the weight fraction of monomer $M_2$ in the polymer, $T_g(M_1)$ is the glass transition temperature of the monomer of $M_1$, and $T_g(M_2)$ is the glass transition temperature of the monomer of $M_2$, all temperatures being in K. The glass transition temperatures of the monomers may be found, for example, in Polymer Handbook, edited by J. Brandrup and E. H. Immergut, Interscience Publishers.

The present invention is a cold-blended composition of an acrylic polymer (PA) dispersion and a polyurethane/acrylic hybrid (PUA) dispersion. "Cold-blended composition" means a composition made by blending the components of the composition without heating.

The acrylic polymer has a Tg from 25° C. to 80° C., preferably from 28° C. to 70° C., and more preferably from 30° C. to 60° C. The polyurethane/acrylic hybrid has a Tg from −55° C. to 0° C., preferably from −45° C. to −5° C., and more preferably from −40° C. to −10° C.

In one embodiment, the polyurethane/acrylic hybrid dispersion and the acrylic polymer dispersion are separately modified by copolymerization with diacetone-based monomers, such as diacetone acrylamide (DAAm), or acetoacetoxyethyl methacrylate (AAEM). The amount of DAAm or AAEM is around 1 to 3 wt. %, based on the total weight of monomers used to make the acrylic polymer or the acrylic portion of polyurethane/acrylic hybrid.

Adipic acid dihydrazide (ADH), as a crosslinker, may be added into to the cold-blended composition of polyurethane/acrylic hybrid dispersion and acrylic polymer dispersion. The loading amount of ADH can be easily calculated according to the loading amount of the diacetone-based monomer or AAEM by the ordinary technicians in the art.

The preparation of the PUA dispersion of the present invention maybe accomplished by reacting a polyol with a polyisocyanate to make a PU polymer first. Then load and polymerize acrylic monomers and/or other vinyl monomers in the presence of the PU polymer to make the PUA dispersion. Commercially purchased PU polymers could be used in the present invention. Polyols useful in the present invention include, polyether diols, polyester diols or multifunctional polyols. "Polyol" means any product having two or more hydroxyl groups per molecule. Non-limiting examples of the polyols include polyether polyols, polyester polyols such as alkyds, polycarbonate polyols, polyhydroxy polyester amides, hydroxyl-containing polycaprolactones, hydroxyl-containing acrylic polymers, hydroxyl-containing epoxides, polyhydroxy polycarbonates, polyhydroxy polyacetals, polyhydroxy polythioethers, polysiloxane polyols, ethoxylated polysiloxane polyols, polybutadiene polyols and hydrogenated polybutadiene polyols, polyisobutylene polyols, polyacrylic polyols, polyols derived from halogenated polyesters and polyethers, and the mixture thereof. The polyether polyols, polyester polyols, and polycarbonate polyols are preferred.

The polyether polyols that may be used in the present invention contain a —C—O—C— group. They can be obtained by the reaction of starting compounds that contain reactive hydrogen atoms such as water or diols, with alkylene oxides such as ethylene oxide, propylene oxide, butylene oxide, styrene oxide, tetrahydrofuran, epichlorohydrin and the mixture thereof. Preferred polyether polyols include poly(propylene glycol) with molecular weight of from 400 to 3000, polytetrahydrofuran and copolymers of poly(ethylene glycol) and poly(propylene glycol). The diols used in the preparation of the polyether polyols include alkylene glycols, preferably ethylene glycol, diethylene glycol and butylene glycol.

The polyester polyols are typically esterification products prepared by the reaction of organic polycarboxylic acids or their anhydrides with a stoichiometric excess of a diol or diols. Non-limiting examples of suitable polyester polyols for use in the reaction include poly(glycol adipate), poly(ethylene terephthalate) polyols, polycaprolactone polyols, alkyd polyols, orthophthalic polyols, sulfonated and phosphonated polyols, and the mixture thereof. The diols used in making the polyester polyols are as set forth for preparing the polyether polyols. Suitable carboxylic acids used in making the polyester polyols include, dicarboxylic acids, tricarboxylic acids and anhydrides, e.g., maleic acid, maleic anhydride, succinic acid, glutaric acid, glutaric anhydride, adipic acid, suberic acid, pimelic acid, azelaic acid, sebacic acid, chlorendic acid, 1,2,4-butane-tricarboxylic acid, phthalic acid, the isomers of phthalic acid, phthalic anhydride, fumaric acid, dimeric fatty acids such as oleic acid, and the like, and the mixture thereof. Preferred polycarboxylic acids used in making the polyester polyols are aliphatic and aromatic dibasic acids.

Particularly preferred polyols are the polyester diols containing a —C(=O)—O— group. Non-limiting examples include poly(butanediol adipate), caprolactones, acid-containing polyols, polyesters made from hexane diol, adipic acid and isophthalic acid such as hexane adipate isophthalate polyester, hexane diol neopentyl glycol adipic acid polyester diols, as well as propylene glycol maleic anhydride adipic acid polyester diols, and hexane diol neopentyl glycol fumaric acid polyester diols.

Polyisocyanates have two or more isocyanate groups on average, preferably two to four isocyanate groups per molecule. Polyisocyanates typically comprise about 5 to 20 carbon atoms and include, aliphatic, cycloaliphatic, arylaliphatic, and aromatic polyisocyanates, as well as products of their oligomerization, used alone or in mixtures of two or more. Diisocyanates are preferred. Toluene diisocyanate, hexamethylene isocyanate and isophorone isocyanate may preferably be used in the embodiment of the present invention.

Non-limiting examples of suitable aliphatic polyisocyanates include omega-alkylene diisocyanates having from 5 to 20 carbon atoms, such as hexamethylene-1,6-diisocyanate, 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, and the mixture thereof. Preferred aliphatic polyisocyanates are hexamethylene-1,6-diisocyanate, 2,2,4-trimethyl-hexamethylene-diisocyanate, and 2,4,4-trimethyl-hexamethylene diisocyanate.

Non-limiting examples of suitable cycloaliphatic polyisocyanates include dicyclohexylmethane diisocyanate (e.g., Desmodur™ from Bayer Corporation), isophorone diisocyanate, 1,4-cyclohexane diisocyanate, 1,3-bis-(isocyanatomethyl)cyclohexane, and the mixture thereof. Preferred cycloaliphatic polyisocyanates are dicyclohexylmethane diisocyanate and isophorone diisocyanate.

Non-limiting examples of suitable araliphatic polyisocyanates include m-tetramethyl xylylene diisocyanate, p-tetramethyl xylylene diisocyanate, 1,4-xylylene diisocyanate, 1,3-xylylene diisocyanate, and the mixture thereof. A preferred araliphatic polyisocyanate is tetramethyl xylylene diisocyanate.

Non-limiting examples of suitable aromatic polyisocyanates include 4,4'-diphenylmethylene diisocyanate, toluene diisocyanate, their isomers, naphthalene diisocyanate, their oligomeric forms and the mixture thereof. A preferred aromatic polyisocyanate is toluene diisocyanate.

The PU polymer dispersion may be prepared without using a catalyst if desired, but using a catalyst is preferred in some embodiments of the present invention. Non-limiting examples of suitable catalysts include stannous octoate, dibutyl tin dilaurate, and tertiary amine compounds such as triethylamine and bis-(dimethylaminoethyl)ether, morpholine compounds, bismuth carboxylate, zinc bismuth carboxylate and diazabicyclo[2.2.2]octane. Organic tin catalysts are preferred.

The PA dispersion of the present invention may comprise a homopolymer of acrylic, a copolymer of acrylic, a copolymer of acrylic with other vinyl monomers, and the mixture thereof.

Non-limiting examples of suitable acrylic monomers include esters of (meth)acrylic acid containing 1 to 18 carbon atoms in the alcohol radical, such as methyl methacrylate, butyl methacrylate, ethyl acrylate, butyl acrylate, cyclohexyl acrylate, hexyl acrylate, 2-ethylhexyl acrylate and stearyl acrylate; di(meth)acrylic acid esters of diols, e.g., ethylene glycol, 1,4-butanediol and 1,6-hexanediol. Methyl (meth)acrylate, ethyl acrylate, butyl acrylate, hexyl acrylate, 2-ethylhexyl acrylate, hydroxyethyl (meth)acrylate, hydroxypropyl (meth)acrylate, glycidyl methacrylate, (meth)acrylic acid and other vinyl monomers, such as styrene, alpha-methyl styrene, ethylene, vinyl acetate, acrylonitrile are preferred.

During polymerization, initiators may be used. Examples of suitable initiators include, peroxides such as potassium peroxy-disulphate, ammonium peroxydisulphate, organic peroxides, organic hydroperoxides and hydrogen peroxide. Redox systems are preferably used, such as water-soluble, radical-producing non-ionogenic peroxides, e.g., t-butyl hydroperoxide, as the oxidation component, and formaldehyde sulphoxylate or ascorbic acid, as the reduction components. Ammonium peroxydisulphateis preferably used.

The polymerization can be carried out using known method for preparing an aqueous dispersion polymerization, employing non-ionic and/or anionic surfactants. Commercial dispersion products may also be used as needed. Preferably, the polymerization is carried out with the previously mentioned monomers and is initiated with radical initiators. Dispersion polymerization is generally conducted at temperatures of about 55° C. to about 90° C., preferably 60° C. to 85° C., and more preferably 75° C. to 80° C. After the completion of the polymerization reaction, the polymer dispersion is allowed to cool to room temperature.

The acrylic monomers used in preparing the PUA dispersion and the PA dispersion could be the same or different.

In one preferred embodiment of the present invention, the acrylic monomers used in preparing the PUA dispersion and those used in the PA dispersion are different.

The cold-blended composition of the PUA dispersion and the PA dispersion can be used for preparing coating compositions.

The coating composition of the present invention may contain at least one conventional coatings adjuvant, including coalescent agents, cosolvents, surfactants, buffers, neutralizers, thickeners, non-thickening rheology modifiers, dispersants, humectants, wetting agents, mildewcides, biocides, plasticizers, antifoaming agents, defoaming agents, anti-skinning agents, colorants, flowing agents, crosslinkers, and anti-oxidants.

In one of the preferred embodiments, the coating composition of the present invention does not comprise significant amount of coalescent agents, cosolvents, or surfactants. "Significant amount" means an amount less than 0.5 wt. %, preferably less than 0.3 wt. % based on the total weight of the coating composition. The coating composition involves a process of selecting and admixing appropriate coating ingredients in correct proportions to provide a coating composition with specific processing and handling properties, as well as a final dry coating film with desired properties.

The coating composition may be applied by conventional application methods such as brushing, roller application, and spraying methods such as air-atomized spray, air-assisted spray, airless spray, high volume low pressure spray, and air-assisted airless spray. Suitable substrates include, concrete, cement board, MDF and particle board, gypsum board, wood, stone, metal, plastics, wall paper and textile. Preferably, all the substrates are pre-primed by waterborne or solvent-borne primers.

EXAMPLES

I. Raw Materials

| A) Materials used in making Polymer compound | |
| --- | --- |
| Compound | Chemical Nature |
| MMA | methyl methacrylate |
| BA | butyl acrylate |
| 2-EHA | 2-ethylhexyl acrylate |
| MAA | methacrylic acid |
| DAAm | diacetone acrylamide |
| t-BHP | t-butyl hydrogen peroxide |
| IAA | isoascorbic acid |
| ADH | adipic dihydrozide |
| EDTA | ethylene diamine tetraacetic acid |
| APS | ammonia persulphate |
| SLS | sodium lauryl sulfate |

| B) Starting materials used in coating formulation | |
| --- | --- |
| Material | Supplier |
| TEGO ™ Airex 902w defoamer | Evonik Industries AG |
| BYK ™ 346 wetting agent | Byk-Chemie GmbH |
| Deutron MK matting agent | Deuteron GmbH |
| TEGO ™ Glide 410 wetting agent | Evonik Industries AG |
| ACRYSOL ™ RM-8W rheology modifier | Dow Chemical Company |
| SILQUEST ™ A-171 crosslinker | Momentive |

II. Experimental Examples

Preparation for Polyurethane/Acrylic Hybrid Dispersion

Hybrid 1

A 3-liter flask reactor equipped with a thermometer, a nitrogen gas inlet tube, a slow addition tube, an agitation/stirring, heating/cooling means, and a condenser was set up. This reactor was charged with 475 g of an aqueous polyurethane dispersion, 140 g of distilled water, 6.4 g of a 0.45% solution of $Fe^{2+}$/EDTA (1:2), 7.0 g of a 3.5% solution of t-butyl hydroperoxide and 191 g of a monomer mixture containing MMA, 2-EHA and DAAm having a 41:54:5 ratio under nitrogen. The reaction mixture was warmed to 35° C. and 5.2 g of a 3.5% solution of isoascorbic acid was added. The beginning of polymerization was signaled by a rise in temperature. The final reaction temperature was raised to above 60° C. After the reaction exotherm was completed, another 16.0 g of 3.5% t-butyl hydroperoxide and another 12.3 g of 3.5% isoascorbic acid were fed into the reactor during one hour. After the addition was completed, the reaction was held for another half an hour. A stable dispersion having a solid content of about 40 percent was obtained. The final hybrid 1 had a Tg of −22° C.

Hybrid 2

The process was the same as in the preparation for Hybrid 1. In this preparation, a monomer mixture containing MMA and 2-EHA having a 52:48 ratio was added. The final hybrid 2 had a Tg of −16° C.

Hybrid 3

The process was the same as in the preparation for Hybrid 1. In this preparation, a monomer mixture containing 2-EHA and DAAm having a 95:5 ratio was added. The final hybrid 3 had a Tg of −53° C.

Hybrid 4

The process was the same as in the preparation for Hybrid 1. In this preparation, a monomer mixture containing MMA, 2-EHA and DAAm having a 78:17:5 ratio was added. The final hybrid 4 had a Tg of −4.3° C.

Hybrid 5 The process was the same as in the preparation for Hybrid 1. In this preparation, a monomer mixture containing 100% MMA monomer was added. The final hybrid 5 had a Tg of 20° C.

Preparation for Acrylic Polymer Dispersion

PA 1

880 g DI water was added to the reaction flask. The contents of the flask were heated to 85° C. under a nitrogen atmosphere. Subsequently, 47.6 g SLS, 3.0 g aqueous ammonia (25%), 46.6 g monomer dispersion, and 2.5 g APS dissolved in 25 g DI water were added. After stirring for several minutes, there was a temperature rise. Next, a monomer dispersion composed of 44.0 g SLS, 476.0 g DI water, 388.7 g 2-EHA, 165.0 g BA, 865.0 g MMA, 37.0 g DAAm and 37.0 g MAA, and an initiator solution containing 2.2 g APS dissolved in 168.0 g DI water were fed separately into the flask during 100 minutes. The reaction flask contents were maintained at a temperature of 85° C. during the addition of the monomer dispersion and the initiator solution. When all additions were completed, the flask reactor temperature was cooled to 75° C. and a catalyst/activator pair t-BHP/IAA was added. The reaction flask was cooled to 45° C. and 15.0 g aqueous ammonia solution (25% active) were added until a pH of 8.0 was achieved. Then 30.0 g ADH dispersed in 120 g DI water was added into the flask. The resulting acrylic polymer dispersion had a 42.0% weight solid content, and a Tg of 31° C.

PA 2

The process was the same as in the preparation for PA 1. In this preparation, a monomer dispersion composed of 44.0 g SLS, 476.0 g DI water, 388.7 g 2-EHA, 182.4 g BA, 888.0 g MMA, 3.0 g SILQUEST A-171 and 30.0 g MAA, and an initiator solution containing 2.2 g APS dissolved in 168.0 g DI water were fed separately into the flask during 100 minutes. The resulting acrylic polymer dispersion had a 43.8% weight solid content, and a Tg of 30° C.

PA 3

The process was the same as in the preparation for PA 1. In this preparation, a monomer dispersion composed of 44.0 g SLS, 476.0 g DI water, 74.8 g BA, 1383.0 g MMA, 3.0 g SILQUEST A-171 and 30.0 g MAA, and an initiator solution containing 2.2 g APS dissolved in 168.0 g water were fed separately into the flask during 100 minutes. The resulting acrylic polymer dispersion had a 43.5% weight solid content, and a Tg of 78° C.

PA 4

The process was the same as in the preparation for PA 1. In this preparation, a monomer dispersion composed of 40.0 g SLS, 476.0 g DI water, 388.7 g 2-EHA, 132.4 g BA, 933.8 g MMA and 37.5 g MAA, and an initiator solution containing 2.2 g APS dissolved in 168.0 g water were fed separately into the flask during 100 minutes. The resulting acrylic polymer dispersion had a 43.5% weight solid content, and a Tg of 35° C.

PA 5

The process was the same as in the preparation for PA 1. In this preparation, a monomer dispersion composed of 40.0 g SLS, 476.0 g DI water, 248.9 g BA, 817.7 g MMA and 37.5 g MAA, and an initiator solution containing 2.2 g APS dissolved in 168.0 g water were fed separately into the flask during 100 minutes. The resulting acrylic polymer dispersion had a 44.6% weight solid content, and a Tg of 25° C.

PA 6

The process was the same as in the preparation for PA 1. In this preparation, a monomer dispersion composed of 56.0 g SLS, 326.0 g DI water, 983.4 g BA, 773.0 g MMA and 45.3 g MAA, and an initiator solution containing 3.2 g APS dissolved in 200.0 g water were fed separately into the flask during 100 minutes. The resulting acrylic polymer dispersion had a 49.6% weight solid content, and a Tg of 14° C.

PA 7

The process was the same as in the preparation for PA 1. In this preparation, a monomer dispersion composed of 40.0 g SLS, 476.0 g DI water, 852.2 g 2-EHA, 611.2 g MMA and 30.5 g MAA, and an initiator solution containing 2.2 g APS dissolved in 168.0 g water were fed separately into the flask during 100 minutes. The resulting acrylic polymer dispersion had a 43.9% weight solid content, and a Tg of 0° C.

Preparation for Coating Compositions

Coating 1—Inventive Example 1 (IE 1)

Coating 1 containing a composition of 21.78 g PA 2 and 50.82 g Hybrid 4 was prepared using the following formulation as shown in Table 1. The ingredients were added using a conventional lab mixer.

TABLE 1

| Coating formulations Coating formulation 1 | |
|---|---|
| Material | Weight(g) |
| Letdown | |
| Binder | Depends |
| Water | 8 |
| TEGO 902W | 0.37 |
| BYK 346 | 0.33 |
| TEGO 410 | 0.2 |

TABLE 1-continued

| Coating formulations Coating formulation 1 | |
|---|---|
| Material | Weight(g) |
| Deutron MK | 3.5 |
| Water | 15 |
| ACRYSOL RM-8W | 0.3 |
| Total | 100 |

Coating 2—Inventive Example 2 (IE 2)

Coating 2 containing a composition of 50.82 g PA 2 and 21.78 g Hybrid 3 was prepared according the same procedure as in the preparation of coating 1.

Coating 3—Inventive Example 3 (IE 3)

Coating 3 containing a composition of 45.91 g PA 3 and 26.69 g Hybrid 3 was prepared according the same procedure as in the preparation of coating 1.

Coating 4—Inventive Example 4 (IE 4)

Coating 4 containing a composition of 20.49 g PA 3 and 52.11 g Hybrid 4 was prepared according the same procedure as in the preparation of coating 1.

Coating 5—Inventive Example 5 (IE 5)

Coating 5 containing a composition of 50.82 g PA 1 and 21.78 g Hybrid 1 was prepared according the same procedure as in the preparation of coating 1.

Coating 6—Inventive Example 6 (IE 6)

Coating 6 containing a composition of 50.82 g PA 5 and 21.78 g Hybrid 2 was prepared according the same procedure as in the preparation of coating 1.

Coating 7—Inventive Example 7 (IE 7) Coating 7 containing a composition of 43.54 g PA 4 and 29.03 g Hybrid 2 was prepared according the same procedure as in the preparation of coating 1.

Coating 8—Comparative Example 1 (CE 1)

Coating 8 containing a composition of 72.6 g PA 7 was prepared according the same procedure as in the preparation of coating 1.

Coating 9—Comparative Example 2 (CE 2)

Coating 9 containing a composition of 50.82 g PA 7 and 21.78 g PA 2 was prepared according the same procedure as in the preparation of coating 1.

Coating 10—Comparative Example 3 (CE 3)

Coating 10 containing a composition of 7.26 g PA 4 and 65.32 g Hybrid 5 was prepared according the same procedure as in the preparation of coating 1.

Coating 11—Comparative Example 4 (CE 4)

Coating 11 containing a composition of 50.82 g PA 6 and 21.78 g Hybrid 1 was prepared according the same procedure as in the preparation of coating 1.

III. Test Methods

MFFT:

The MFFT measurement was carried out by drawing down a coating film onto a metal bar subjected to a thermal gradient and then passing dry air over the dispersion until the film was dry. The MFFT was taken to be the minimum temperature where one observed a clear and crack-free film. It was common in the coating industry to assume that a substantial extent of polymer diffusion took place at temperatures above but not far from the MFFT.

Early Block Resistance:

Block resistance was detected according to Chinese standard GB/T 23982-2009.

Panels were prepared by brush applying two coating films at 80-90 g/m$^2$ over each type of wood (5 cm*7 cm). After the first application, panels were left at room temperature for four hrs then sanded with sand paper. After the second application, panels were allowed to dry at room temperature for 24 hrs before running the block resistance tests. Sample panels were blocked together (coating film to coating film) with 1 kg weight on top of them and then sent to oven to bake. Baking was conducted at 50° C. for 4 hrs. After that, block resistances were rated according to the following standard to indicate the difficulties in separating those wood blocks. The rating was recorded by "X—N", X was a letter representing the separating force, N was a number representing damage percentage. A: separate without any force; B: separate with very slight force; C: separate with light force; D: separate with medium force; E: separate with big force; F: separate with tools; 0: no damage of coating film; 1: ≤1% damage of coating film; 2: 1%-5% damage of coating film; 3: 5%-20% damage of coating film; 4: 20%-50% damage of coating film; 5: ≥50% damage of coating film.

IV. Results and Analysis

As shown in Table 2, inventive examples (IEs) 1-7 comprised binders with two parts: an acrylic polymer dispersion and a polyurethane/acrylic hybrid dispersion. Both parts had Tgs within the ranges of the present invention. The final coatings had MFFTs lower than 10° C. (acceptable) and early block resistances better than B-0 (acceptable).

Comparative example (CE) 1 comprised a binder comprising only an acrylic polymer dispersion. The final coating had a MFFT of lower than 10° C. (acceptable), but an early block resistance of F (unacceptable).

Comparative example 2 comprised a binder with two polyacrylic dispersions (PA 2 and PA 7). PA 2 had a Tg of 30° C., that is, between 80 and 25° C., while PA 7 had a Tg of 0° C., that is, between 0 and −55° C., the final coating had a MFFT of lower than 10° C. (acceptable), but an early block resistance of F (unacceptable).

Comparative example 3 comprised a binder with PA 4 and Hybrid 5. PA 4 had a Tg of 35° C. (inside the range of the present invention), while Hybrid 5 had a Tg of 20° C. (outside the range of the present invention). The final coating had a MFFT of lower than 10° C. (acceptable), but an early block resistance of E-2 (unacceptable).

Comparative example 4 comprised a binder with PA 6 and Hybrid 1. PA 6 had a Tg of 14° C. (outside the range of the present invention), while Hybrid 1 had a Tg of −22° C. (inside the range of the present invention). The final coating had a MFFT of lower than 10° C. (acceptable), but an early block resistance of F (unacceptable).

TABLE 2

Coating results

| Examples | Binder Tg of PA (° C.) | Binder Tg of Hybrid (° C.) | Binder Ratio of PA/Hybrid | MFFT (° C.) | Early Block resistance |
|---|---|---|---|---|---|
| IE 1 | 30 | −4.3 | 0.43 | <10 | B-0 |
| IE 2 | 30 | −53 | 2.33 | <10 | B-0 |
| IE 3 | 78 | −53 | 1.72 | <10 | A-0 |
| IE 4 | 78 | −4.3 | 0.39 | <10 | B-0 |
| IE 5 | 31 | −22 | 2.33 | <10 | B-0 |
| IE 6 | 25 | −16 | 2.33 | <10 | B-0 |
| IE 7 | 35 | −16 | 1.50 | <10 | B-0 |
| CE 1 | 0 | N/A | N/A | <10 | F |
| CE 2 | 0 | 30 | 2.33 | <10 | F |
| CE 3 | 35 | 20 | 0.11 | <10 | E-2 |
| CE 4 | 14 | −22 | 2.33 | <10 | F |

What is claimed is:

1. A composition comprising i) an acrylic polymer dispersion having a Tg from 25° C. to 80° C. and ii) a polyurethane/acrylic hybrid component having a Tg from −55° C. to 0° C.;
    wherein the composition has a minimum film formation temperature of lower than 10° C., and
    wherein the acrylic polymer dispersion further comprises, as polymerized units, a diacetone acrylamide in an amount of 1 to 3 weight percent based on the total weight of monomers used to make the acrylic polymer.

2. The composition according to claim 1, wherein the acrylic monomers in the acrylic polymer dispersion and in the polyurethane/acrylic hybrid are different acrylic compounds.

3. The composition according to claim 1, wherein the polyurethane/acrylic hybrid further comprises, as polymerized units, a diacetone acrylamide.

4. The composition according to claim 3, wherein the polyurethane/acrylic hybrid comprises, as polymerized units, a diacetone acrylamide in an amount of 1 to 3 weight percent based on the total weight of monomers used to make the acrylic portion of the polyurethane/acrylic hybrid.

5. The composition according to claim 1 further comprising an adipic acid dihydrazide.

6. The composition according claim 1, wherein the acrylic polymer dispersion has a Tg from 28° C. to 70° C. and the polyurethane/acrylic hybrid has a Tg from −45° C. to −5° C.

7. A coating comprising i) an acrylic polymer dispersion and ii) a polyurethane/acrylic hybrid; wherein the acrylic polymer dispersion has a Tg from 25° C. to 80° C.;
    wherein the polyurethane/acrylic hybrid has a Tg from −55° C. to 0° C.; wherein the composition has a minimum film formation temperature of lower than 10° C., and
    wherein the acrylic polymer dispersion further comprises, as polymerized units, a diacetone acrylamide in an amount of 1 to 3 weight percent based on the total weight of monomers used to make the acrylic polymer.

8. The coating according to claim 7, wherein acrylic monomers in the acrylic polymer dispersion and in the polyurethane/acrylic hybrid are different acrylic compounds.

9. The coating according to claim 7, wherein the polyurethane/acrylic hybrid further comprises, as polymerized units, a diacetone acrylamide.

10. The coating according to claim 7, wherein the composition further comprises an adipic acid dihydrazide.

11. The coating according to claim 7, wherein the acrylic polymer dispersion has a Tg from 28° C. to 70° C. and the polyurethane/acrylic hybrid has a Tg from −45° C. to −5° C.

* * * * *